US011381811B2

United States Patent
Rath et al.

(10) Patent No.: US 11,381,811 B2
(45) Date of Patent: Jul. 5, 2022

(54) METHOD AND APPARATUS FOR LOW-COMPLEXITY BI-DIRECTIONAL INTRA PREDICATION IN VIDEO ENCODING AND DECODING

(71) Applicant: InterDigital VC Holdings, Inc., Wilmington, DE (US)

(72) Inventors: Gagan Bihari Rath, Cesson-Sevigne (FR); Fabrice Leleannec, Cesson-Sevigne (FR); Fabien Racape, Palo Alto, CA (US); Fabrice Urban, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/649,620

(22) PCT Filed: Nov. 20, 2018

(86) PCT No.: PCT/US2018/061948
§ 371 (c)(1),
(2) Date: Mar. 20, 2020

(87) PCT Pub. No.: WO2019/104004
PCT Pub. Date: May 31, 2019

(65) Prior Publication Data
US 2020/0275096 A1 Aug. 27, 2020

(30) Foreign Application Priority Data
Nov. 21, 2017 (EP) ..................... 17306608

(51) Int. Cl.
*H04N 19/11* (2014.01)
*H04N 19/105* (2014.01)
*H04N 19/159* (2014.01)

(52) U.S. Cl.
CPC ........... *H04N 19/11* (2014.11); *H04N 19/105* (2014.11); *H04N 19/159* (2014.11)

(58) Field of Classification Search
None
See application file for complete search history.

(56) References Cited

U.S. PATENT DOCUMENTS

2017/0094285 A1 3/2017 Said et al.
2017/0310959 A1* 10/2017 Chen ...................... H04N 19/11
2017/0353730 A1* 12/2017 Liu ......................... H04N 19/96

FOREIGN PATENT DOCUMENTS

WO WO2012167119 A1 12/2012
WO WO2016066093 A1 5/2016

OTHER PUBLICATIONS

Guo et al., "Direction based Angular Intra Prediction", Joint Collaborative Team on Video Coding, (JCT-VC) of ITU-T SG16 WP3 and ISO/IEC JTC1/SC29/WG11, Document: JCTVC-F122, 6th Meeting: Torino, Italy, Jul. 14-22, 2011.
Chen et al., "Further improvements to HMKTA-1.0", ITU—Telecommunications Standardization Sector, Study Group 16 Question 6, Video Coding Experts Group (VCEG), Document: VCEG-AZ07_v2, 52nd Meeting: Jun. 19-26, 2015, Warsaw, Poland.
(Continued)

*Primary Examiner* — Stuart D Bennett
(74) *Attorney, Agent, or Firm* — Xiaoan Lu

(57) ABSTRACT

At least one of the present embodiments generally relates to a method and an apparatus for video encoding and decoding, and more particularly, to a method and an apparatus for low-complexity bi-directional intra prediction. For example, a subset of a plurality of directional intra prediction modes is selected based on a shape of a current block of a picture being encoded or decoded. For a selected intra prediction mode in this subset, a sample value is bi-directionally intra predicted by using two predictors. The two predictors are substantially on a line based on a direction corresponding to the selected directional intra prediction mode. The bi-directional intra prediction may be only applied to large luma blocks, but not chroma blocks in order to reduce the com- (Continued)

putational complexity. When bi-directional intra prediction is used, the smoothing filtering may be omitted in intra prediction to further reduce the complexity.

18 Claims, 11 Drawing Sheets

(56) References Cited

OTHER PUBLICATIONS

Haung et al., "EE2.1: Quadtree Plus Binary Tree Structure Integration with JEM Tools", Joint Video Exploration Team, (JVET) of ITU-T SG 16 WP 3 and ISO/IEC JTC 1/SC 29/WG 11, Document: JVET-C0024, 3rd Meeting Geneva, CH, May 26-Jun. 1, 2016.
Shiodera et al., "Block Based Extra/Inter-Polating Prediction for Intra Coding", 2007 IEEE International Conference on Image Processing, Sep. 16-Oct. 19, 2007, pp. 445-448, IEEE, San Antonio, TX, USA.
Lin et al., "Improved Intra prediction for positive directions in UDI", Joint Collaborative Team on Video Coding, (JCT-VC) of ITU-T SG16 WP3 and ISO/IEC JTC1/SC29/WG11, Document: JCTVC-D300, 4th Meeting: Daegu, KR, Jan. 20-28, 2011.
Lin et al., "CE6 Subset A: Report of Improved Intra prediction for positive directions in UDI", Joint Collaborative Team on Video Coding, (JCT-VC) of ITU-T SG16 WP3 and ISO/IEC JTC1/SC29/WG11, Document: JCTVC-E286, 5th Meeting: Geneva, Mar. 16-23, 2011.

\* cited by examiner

METHOD AND APPARATUS FOR LOW-COMPLEXITY BI-DIRECTIONAL INTRA PREDICATION IN VIDEO ENCODING AND DECODING

This application claims the benefit, under 35 U.S.C. § 371 of International Application No. PCT/US18/061948, filed Nov. 20, 2018, which was published on May 31, 2019, which claims the benefit of European Patent Application No. EP17306608.5 filed Nov. 21, 2017.

TECHNICAL FIELD

At least one of the present embodiments generally relates to a method and an apparatus for video encoding and decoding, and more particularly, to a method and an apparatus for low-complexity bi-directional intra prediction.

BACKGROUND

To achieve high compression efficiency, image and video coding schemes usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding.

Intra prediction in video compression refers to the spatial prediction of a block of pixels using information from causal neighbor blocks, that is, neighboring blocks in the same frame which have already been encoded or decoded. Intra prediction is a powerful coding tool since it allows for high compression efficiency in INTRA frames, as well as in INTER frames. Therefore, intra prediction has been included as a core coding tool in many video compression standards including, but not limited to, H.264/AVC and H.265/HEVC (High Efficiency Video Coding). Many of the existing video coding standards use fixed-point implementations of coding tools.

Recent additions to video compression technology include various versions of the reference software and/or documentations Joint Exploration Model (JEM) being developed by the Joint Video Exploration Team (JVET). The aim of JEM is to make further improvements to the existing HEVC standard.

SUMMARY

According to a general aspect of at least one embodiment, a method for video decoding is presented, comprising: selecting a subset of a plurality of directional intra prediction modes based on a shape of a current block of a picture being decoded; selecting a directional intra prediction mode from the subset of the plurality of directional intra prediction modes; accessing, based on the directional intra prediction mode, a first predictor for a sample, the sample being within the current block; accessing, based on the directional intra prediction mode, a second predictor for the sample, the first and second predictors being substantially on a line based on a direction corresponding to the directional intra prediction mode; bi-directionally intra predicting a sample value of the sample, by using the first and second predictors; and decoding the sample of the current block based on the predicted sample value.

According to another general aspect of at least one embodiment, a method for video encoding is presented, comprising: selecting a subset of a plurality of directional intra prediction modes based on a shape of a current block of a picture being encoded; selecting a directional intra prediction mode from the subset of the plurality of directional intra prediction modes; accessing, based on the directional intra prediction mode, a first predictor for a sample, the sample being within the current block; accessing, based on the directional intra prediction mode, a second predictor for the sample, the first and second predictors being substantially on a line based on a direction corresponding to the directional intra prediction mode; bi-directionally intra predicting a sample value of the sample, by using the first and second predictors; and encoding the sample of the current block based on the predicted sample value.

According to another general aspect of at least one embodiment, an apparatus for video decoding is presented, comprising: at least a memory and one or more processors, wherein said one or more processors are configured to: select a subset of a plurality of directional intra prediction modes based on a shape of a current block of a picture being decoded; select a directional intra prediction mode from the subset of the plurality of directional intra prediction modes; access, based on the directional intra prediction mode, a first predictor for a sample, the sample being within the current block; access, based on the directional intra prediction mode, a second predictor for the sample, the first and second predictors being substantially on a line based on a direction corresponding to the directional intra prediction mode; bi-directionally intra predict a sample value of the sample, by using the first and second predictors; and decode the sample of the current block based on the predicted sample value.

According to another general aspect of at least one embodiment, an apparatus for video decoding is presented, comprising: means for selecting a subset of a plurality of directional intra prediction modes based on a shape of a current block of a picture being decoded; means for selecting a directional intra prediction mode from the subset of the plurality of directional intra prediction modes; means for accessing, based on the directional intra prediction mode, a first predictor for a sample, the sample being within the current block; means for accessing, based on the directional intra prediction mode, a second predictor for the sample, the first and second predictors being substantially on a line based on a direction corresponding to the directional intra prediction mode; means for bi-directionally intra predicting a sample value of the sample, by using the first and second predictors; and means for decoding the sample of the current block based on the predicted sample value.

According to another general aspect of at least one embodiment, an apparatus for video encoding is presented, comprising at least a memory and one or more processors, wherein said one or more processors are configured to: select a subset of a plurality of directional intra prediction modes based on a shape of a current block of a picture being encoded; select a directional intra prediction mode from the subset of the plurality of directional intra prediction modes; access, based on the directional intra prediction mode, a first predictor for a sample, the sample being within the current block; access, based on the directional intra prediction mode, a second predictor for the sample, the first and second predictors being substantially on a line based on a direction corresponding to the directional intra prediction mode; bi-directionally intra predict a sample value of the sample, by using the first and second predictors; and encode the sample of the current block based on the predicted sample value.

According to another general aspect of at least one embodiment, an apparatus for video encoding is presented, comprising: means for selecting a subset of a plurality of directional intra prediction modes based on a shape of a current block of a picture being encoded; means for selecting a directional intra prediction mode from the subset of the plurality of directional intra prediction modes; means for accessing, based on the directional intra prediction mode, a first predictor for a sample, the sample being within the current block; means for accessing, based on the directional intra prediction mode, a second predictor for the sample, the first and second predictors being substantially on a line based on a direction corresponding to the directional intra prediction mode; means for bi-directionally intra predicting a sample value of the sample, by using the first and second predictors; and means for encoding the sample of the current block based on the predicted sample value.

According to another general aspect of at least one embodiment, the shape of the current block being decoded or encoded is rectangle and the subset is selected based on whether the rectangle's width is greater than the rectangle's height.

According to another general aspect of at least one embodiment, when the rectangle's width is greater than the rectangle's height then the selected subset of the plurality of directional intra prediction modes comprises: Kmax number of positive horizontal directional intra prediction modes closest to the most positive horizontal directional mode, and (Kmax*(H/W)) number of positive vertical directional intra prediction modes closest to the most positive vertical directional mode, wherein Kmax is a number from 2 to 16, H is the rectangle's height, W is the rectangle's width.

According to another general aspect of at least one embodiment, when the rectangle's height is greater than the rectangle's width then the selected subset of the plurality of directional intra prediction modes comprises Kmax number of positive vertical directional intra prediction modes closest to the most positive vertical directional mode, and (Kmax*(W/H)) number of positive horizontal directional intra prediction modes closest to the most positive horizontal directional mode, wherein Kmax is a number from 2 to 16, H is the rectangle's height, W is the rectangle's width.

According to another general aspect of at least one embodiment, current block size is determined before the selecting a subset of the plurality of directional intra prediction modes, and the selecting a subset of the plurality of directional intra prediction modes is made when the determined current block size is greater than a preset value.

According to another general aspect of at least one embodiment, the predicted sample value is not further filtered by a smoothing filter.

According to another general aspect of at least one embodiment, a decision is made to determine if the current block is a luma block, and the bi-directional intra prediction is applied when the current block is determined to be a luma block.

According to another general aspect of at least one embodiment, the preset value is 4, 8, 16, or 32 pixels.

According to another general aspect of at least one embodiment, a flag is included in a bitstream for indicating that bi-directional intra prediction is used.

According to another general aspect of at least one embodiment, a bitstream is presented, wherein the bitstream is formed by: selecting a subset of a plurality of directional intra prediction modes based on a shape of a current block of a picture being decoded; selecting a directional intra prediction mode from the subset of the plurality of directional intra prediction modes; accessing, based on the directional intra prediction mode, a first predictor for a sample, the sample being within the current block; accessing, based on the directional intra prediction mode, a second predictor for the sample, the first and second predictors being substantially on a line based on a direction corresponding to the directional intra prediction mode, bi-directionally intra predicting a sample value of the sample, by using the first and second predictors; and encoding the sample of the current block based on the predicted sample value.

One or more of the present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide a method and apparatus for transmitting the bitstream generated according to the methods described above.

DETAILED DESCRIPTION

Figure 1:
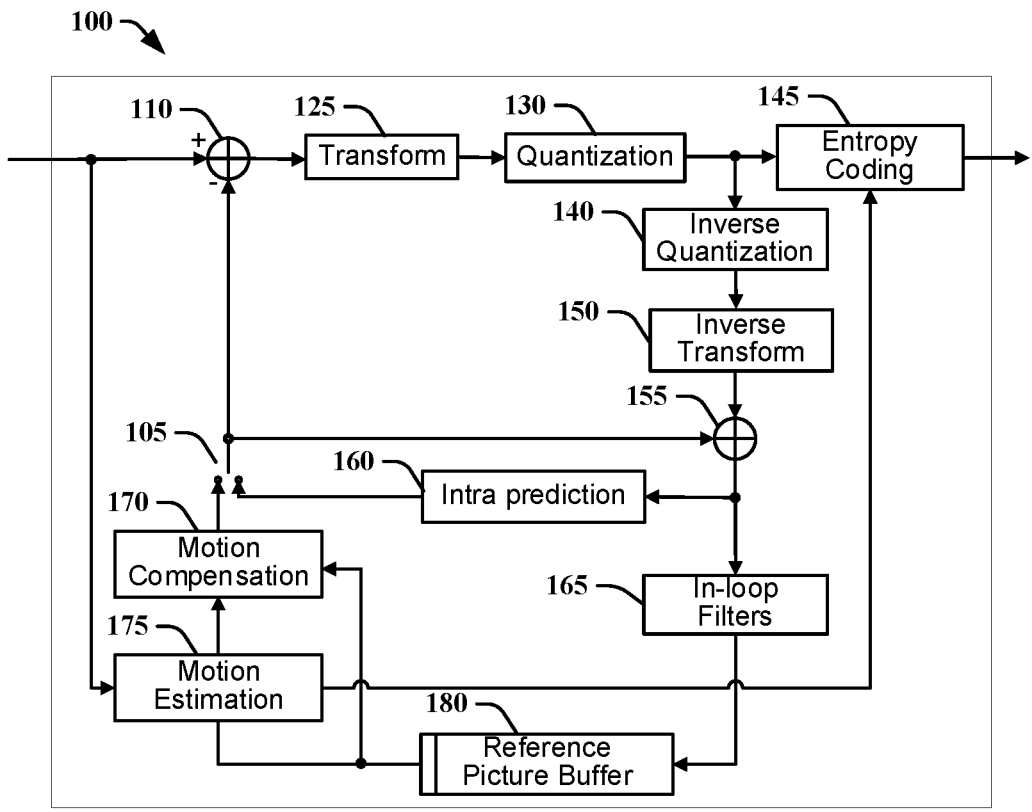
FIG. 1 illustrates a block diagram of an exemplary video encoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably, the terms "picture" and "frame" may be used interchangeably, and the terms "pixel" and "sample" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

Figure 2A:
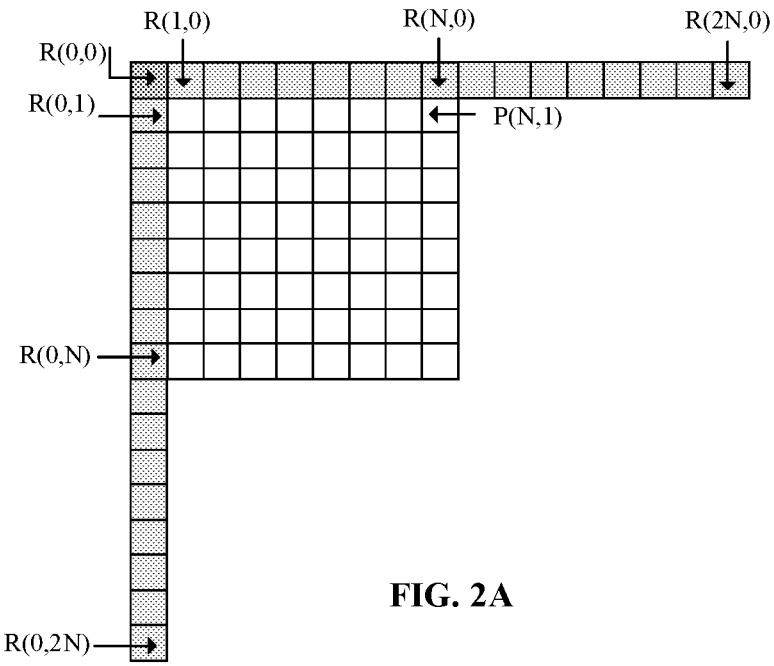
FIG. 2A is a pictorial example depicting the HEVC reference sample generation.

The intra prediction process in HEVC includes three steps: (1) reference sample generation, (2) intra sample prediction, and (3) post-processing of predicted samples. Exemplary HEVC reference samples are illustrated in FIG. 2A, where the reference pixel value at coordinate (x, y), with respect to one pixel above and to the left of the above-left corner of the current block, is indicated by R(x,y), and the predicted sample value at coordinate (x, y) of the current block is indicated by P(x,y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CU is not in the same slice or the current CU is at a frame boundary, then reference sample substitution is performed where the missing samples are copied from the available samples in a clock-wise direction. Then, depending on the current CU size and the prediction mode, the reference samples are filtered using a specified filter.

Figure 2B:
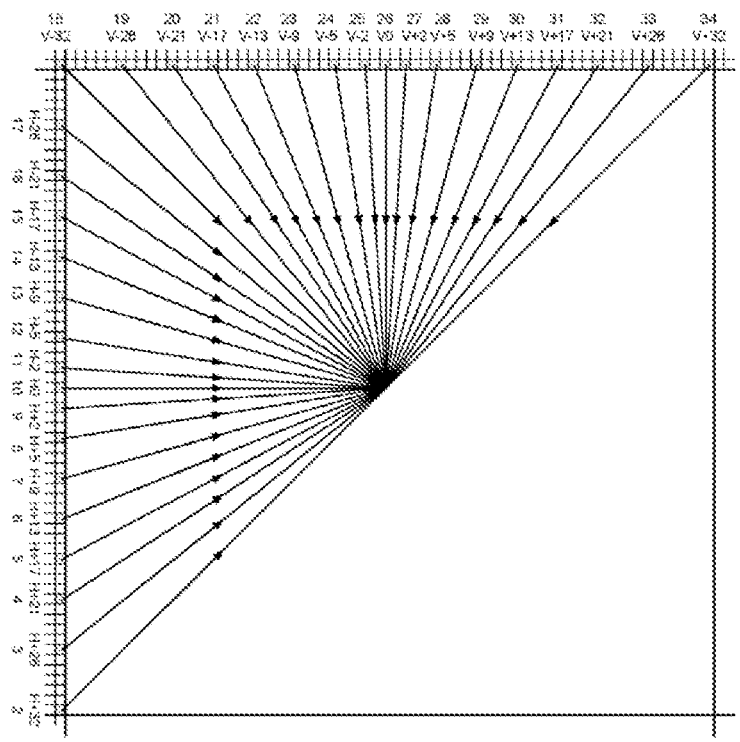
FIG. 2B is a pictorial example depicting intra prediction directions and corresponding modes in HEVC.

The next step, i.e., the intra sample prediction, consists of predicting the pixels of the target CU based on the reference samples. In order to predict different kinds of content efficiently, HEVC supports a range of prediction methods. In particular, planar and DC prediction modes are used to predict smooth and gradually changing regions, whereas directional prediction modes (also referred to as "angular prediction modes") are used to capture different directional structures. HEVC supports 33 directional prediction modes which are indexed from 2 to 34. These prediction modes correspond to different prediction directions as illustrated in FIG. 2B, wherein the numbers (i.e., 2, 3, . . . , 34) denote intra prediction mode indices. The prediction modes 2-17 are denoted as horizontal prediction modes (H−26 to H+32), as the predominant sources of prediction is in horizontal direction. The modes 18-34 are denoted as vertical prediction modes (V−32 to V+32) accordingly. "H" and "V" in FIG. 2B are used to indicate the horizontal and vertical directionalities, respectively, while the numeric part of the identifier indicates the pixels' displacement (also referred to as "angle parameter") at 1/32 pixel fractions.

Table 1 shows the relationship between the directional prediction mode and the angle parameter A as specified by HEVC.

TABLE 1

| | Horizontal directions | | | | | | | | | | | | | | | |
|---|---|---|---|---|---|---|---|---|---|---|---|---|---|---|---|---|
| Mode index | 2 | 3 | 4 | 5 | 6 | 7 | 8 | 9 | 10 | 11 | 12 | 13 | 14 | 13 | 16 | 17 |
| A | 32 | 26 | 21 | 17 | 13 | 9 | 5 | 2 | 0 | −2 | −5 | −9 | −13 | −17 | −21 | −26 |
| | Vertical directions | | | | | | | | | | | | | | | |
| Mode index | 18 | 19 | 20 | 21 | 22 | 23 | 24 | 25 | 26 | 27 | 28 | 29 | 30 | 31 | 32 | 33 | 34 |
| A | −32 | −26 | −21 | −17 | −13 | −9 | −5 | −2 | 0 | 2 | 5 | 9 | 13 | 17 | 21 | 26 | 32 |

The directions with non-negative displacements (i.e., H0 to H+32 and V0 to V+32) are also denoted as positive directions, and the directions with negative displacements (i.e., H−2 to H−26 and V−2 to V−32) are also denoted as negative directions. Positive prediction direction may also be defined as direction having positive A value, and negative prediction direction may be defined as direction having negative A values.

As shown in FIG. 2B, the defined angular directions have a sample accuracy of 1/32. That is, the interval between two pixels, either in horizontal or vertical directions, is divided into 32 subintervals. As described above, the defined directions can be distinguished as either vertical or horizontal. The prediction modes in horizontal directions use either only left reference samples, or some left and some top reference samples. Similarly, the prediction modes in vertical directions use either only top reference samples, or some top and some left reference samples. The horizontal positive directions from H0 to H+32 use only the left reference samples for prediction. Similarly, the vertical positive directions from V0 to V+32 use only the top reference samples for prediction. Negative horizontal and vertical directions (H−2 to H−26 and V−2 to V−32) use reference samples both on the left and on the top for prediction. The directional intra prediction mode with the largest angle parameter in the horizontal or vertical direction is considered as the most positive horizontal or vertical directional intra prediction mode. For example, in FIG. 2B, mode 2 is considered as the most positive horizontal directional intra prediction mode (H+32), and mode 34 is considered as the most positive vertical directional intra prediction mode (V+32).

In HEVC reference code, a reference array is first constructed using the top and left reference samples. For vertical predictions, the reference array is horizontal (i.e., a row of reference samples) and for horizontal predictions, the reference array is vertical (i.e., a column of reference samples). For the modes with positive directions, the reference array is simply the top or left reference samples depending on the direction:

$$\text{topRef}[x]=R(x,0), 0 \leq x \leq 2N, \text{ for vertical predictions} \quad (1)$$

$$\text{leftRef}[y]=R(0,y), 0 \leq y \leq 2N, \text{ for horizontal predictions} \quad (2)$$

Figure 2C:
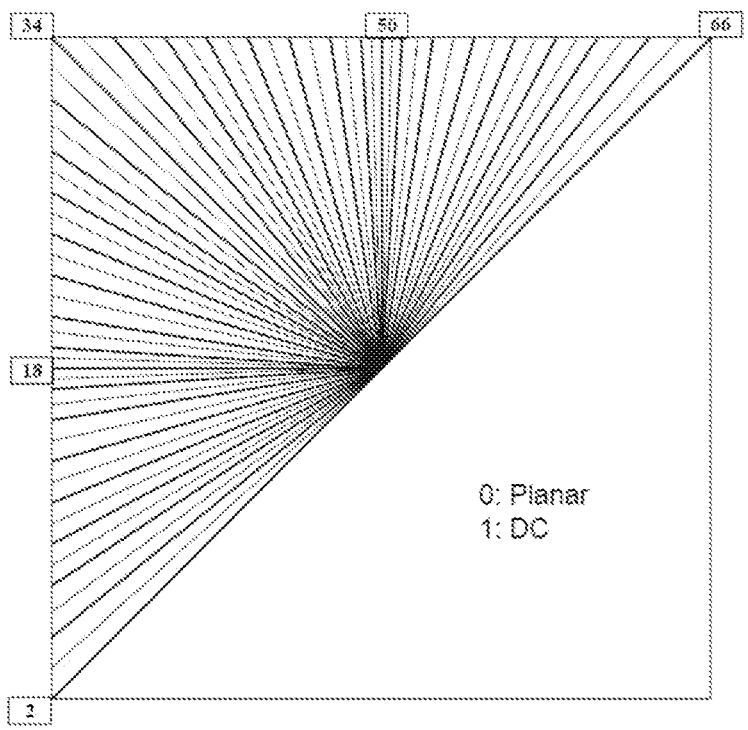
FIG. 2C is a pictorial example depicting intra prediction directions and corresponding modes in JEM (Joint Exploration Model)
Figure 2D:
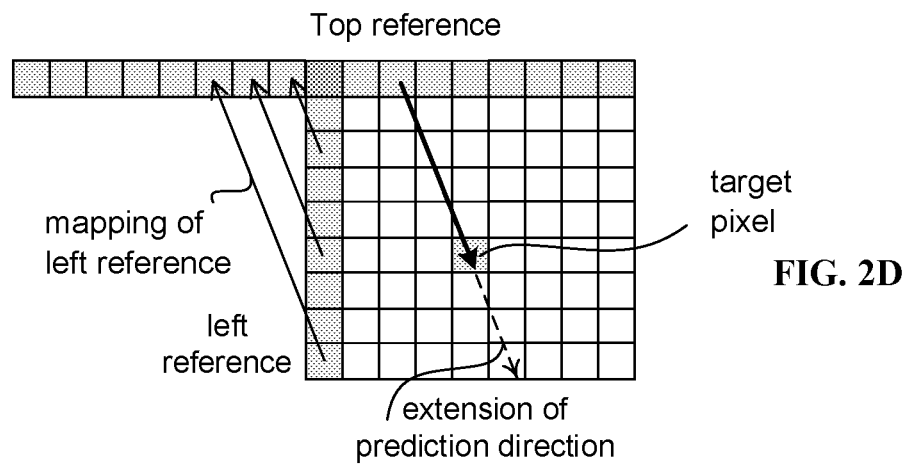
FIG. 2D is a pictorial example depicting the prediction and construction of the top reference array for a negative vertical direction.

For the modes with negative directions, the reference array needs pixels from both the top and left reference arrays. In this case, the reference array will extend to the negative indices beyond 0. Sample values on the reference array with positive indices are obtained as above depending on vertical or horizontal prediction. Those on the reference array with negative indices are obtained by projecting the left (for vertical predictions) or top reference pixels (for horizontal predictions) on the reference array in the prediction direction:

$$\text{topRef}[x]=R(0,(x*B+128)>>8),-N \leq x<0, \text{ for vertical predictions}$$

$$\text{leftRef}[y]=R((y*B+128)>>8,0),-N \leq y<0, \text{ for horizontal predictions}$$

where << denotes a bit shift operation to the right and B represents the inverse angle parameter corresponding to angle parameter A. FIG. 2D illustrates the construction of the top reference array for negative directions with the mapping of samples from the left reference array.

Once the reference array is constructed, the prediction at any pixel position (x, y) inside the target PU is obtained by projecting the pixel position to the reference array along the selected direction and interpolating a value for the same at 1/32 pixel accuracy. The predicted sample value is computed by interpolating between two closest reference samples:

$$P(x,y)=((32-f)*\text{topRef}[x+i]+f*\text{topRef}[x+i+1]+16)>>5), 1 \leq x,y \leq N, \text{ for vertical predictions} \quad (3)$$

$$P(x,y)=((32-f)*\text{leftRef}[y+i]+f*\text{leftRef}[y+i+1]+16)>>5), 1 \leq x,y \leq N, \text{ for horizontal predictions}, \quad (4)$$

where i and f denote the integer part and the fractional part of the projected displacement from the pixel location (x, y). If Δ denotes the projected displacement, then $$\Delta=x*A, \text{ for horizontal predictions, and } \Delta=y*A, \text{ for vertical predictions.}$$

$$i=\Delta>>5, f=\Delta \& 31$$

where & denotes a bitwise AND operation. Note that, if f=0, that is, there is no fractional part, and the predicted sample value is equal to the reference array sample value in the direction of prediction.

In HEVC, some of the prediction modes such as the DC mode and directly horizontal (i.e., mode 10) and directly vertical modes (i.e., mode 26) may cause discontinuity at the CU boundaries of the prediction samples. Therefore, such prediction modes are followed by post-processing where the boundary of the predicted samples are smoothed using a smoothing filter such as e.g., a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

Since there are multiple intra prediction modes available, the decoder needs the mode information to form the prediction for an intra-coded CU. The encoder encodes the mode information using a most probable mode (MPM) set for the luma component. HEVC specifies an MPM set consisting of three distinct modes, which is constructed from the prediction modes of the intra coded CUs on the top and left of the current CU, the planar mode, the DC mode, and the directly vertical mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP)

and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
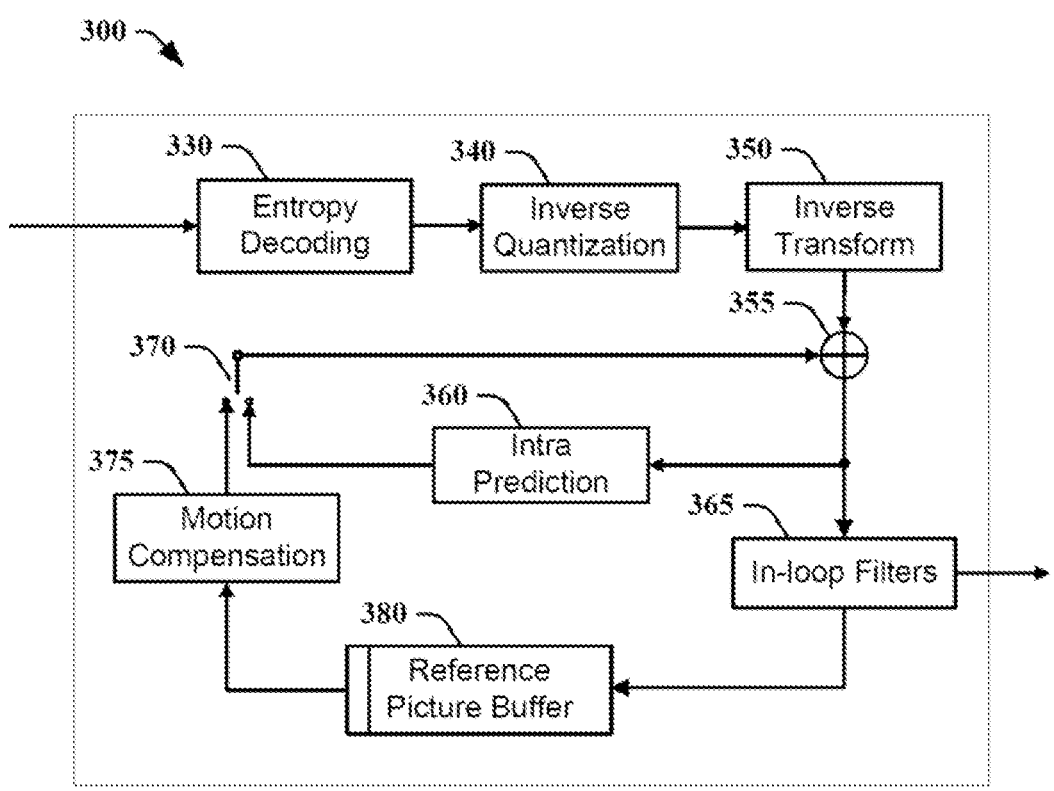
FIG. 3 illustrates a block diagram of an exemplary video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which also performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

As described above, in HEVC, encoding of a frame of video sequence is based on a block structure. A frame is divided into square coding tree units (CTUs), which may undergo quadtree (QT) splitting to multiple coding units based on rate-distortion criteria. Each CU is either intra-predicted, that is spatially predicted from the causal neighbor CUs, or inter-predicted, that is, temporally predicted from reference frames already decoded. In I-slices all CUs are intra-predicted, whereas in P and B slices the CUs can be either intra or inter-predicted. For intra prediction, HEVC defines 35 prediction modes which include one planar mode (indexed as mode 0), one DC mode (indexed as mode 1) and 33 directional prediction modes (indexed as modes 2-34).

In JEM, the QTBT (Quadtree plus Binary Tree) structure removes the concept of multiple partition types in HEVC, i.e., removes the separation of CU, PU and TU concepts. A Coding Tree Unit (CTU) is first partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components. For ease of notation, the CUs or blocks resulting from a binary tree partition are also referred to as binary tree (BT) CUs or blocks, and the CUs or blocks resulting from a quadtree partition are also referred to as quadtree (QT) CUs or blocks.

Current proposals in JEM also increase the number of the intra prediction modes compared with HEVC. For example, as shown in FIG. 2C, JEM 3.0 uses 65 directional intra prediction modes in addition to the planar mode 0 and the DC mode 1. The directional intra prediction modes are numbered from 2 to 66 in the increasing order, in the same fashion as done in HEVC from 2 to 34 as shown in FIG. 2B. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of finer angular structures with proposed larger block sizes. Corresponding to the higher number of modes, there is a higher number of angle parameter A values. As illustrated in FIG. 2C, in JEM, mode 2 is considered as the most positive horizontal directional intra prediction mode (same as in HEVC), and mode 66 is considered as the most positive vertical directional intra prediction mode.

In addition to square CUs, JEM can also have rectangular CUs because of the QTBT structure. In this case, for positive directions, the reference array is constructed as follows:

$$\text{topRef}[x]=R(x,0), 0 \le x \le W+H, \text{ for vertical predictions}$$

$$\text{leftRef}[y]=R(0,y), 0 \le y \le W+H, \text{ for horizontal predictions}$$

where W and H denote the width and the height of the target CU, respectively. For negative directions, the reference array is constructed as above for positive indices. For negative indices, the projections of the left reference array (for vertical predictions) or top reference array (for horizontal predictions) are used:

$$\text{topRef}[x]=R(0,(x*B+128)>>8), -H \le x<0, \text{ for vertical predictions}$$

$$\text{leftRef}[y]=R((y*B+128)>>8,0), -W \le y<0, \text{ for horizontal predictions.}$$

The prediction process basically remains the same as in HEVC. The pixel values are computed as:

$$P(x,y)=((32-f)*\text{topRef}[x+i]+f*\text{topRef}[x+i+1]+16)>>5, \quad 1 \le x \le W, 1 \le y \le H, \text{ for vertical predictions} \quad (5)$$

$$P(x,y)=((32-f)*\text{leftRef}[y+i]+f*\text{leftRef}[y+i+1]+16)>>5, \quad 1 \le x \le W, 1 \le y \le H, \text{ for horizontal predictions.} \quad (6)$$

As described above, HEVC and JEM aim to model different directional structures by different angular prediction models. Depending on the directionality, some prediction directions are termed positive and some are termed negative. The prediction models work well when the intensity values do not change too much along the prediction direction. However, in natural imagery, the intensity values on objects often undergo changes due to several reasons. For example, because of a color property of the object itself, lighting, depth, motion, etc., the intensity values over a PU can undergo changes that cannot be sufficiently modelled using pixel repetition. This is especially true when the PU size is large, for example, JEM has proposed to use CTU sizes up to 256. Therefore, we may consider other prediction models that may model the intensity change more efficiently.

Accordingly, various aspects of JEM aim to improve upon previously known video compression techniques in a rate distortion (RD) optimized way. One well known and commonly used example of a determination of the rate distortion cost is defined as follows:

RD_cost=$D+\lambda \times R$ wherein D represents the distortion (typically an L2 norm) between the original block and a reconstructed block obtained by encoding and decoding the current CU with the considered candidate; R represents the rate cost, e.g. the number of bits generated by coding the current block with the considered candidate; $\lambda$ is the Lagrange parameter, which represents the rate target at which the video sequence is being encoded.

Bi-Directional Intra Prediction

Commonly owned EP applications, entitled "Method and Apparatus for Bi-Directional Intra Prediction for Negative Directions in Video Encoding and Decoding" (EP17305629.2, Attorney Docket No. PF170080), "Method and Apparatus for Intra Prediction with Interpolation" (EP17305635.9, Attorney Docket No. PF170090), "Method and Apparatus for Low-Complexity Bi-Directional Intra Prediction in Video Encoding and Decoding" (EP17305639.1, Attorney Docket No. PF170091), the teachings of which are specifically incorporated herein by reference, disclose different methods relating to bi-directional intra prediction in positive or negative intra prediction directions.

In one example, bi-directional intra prediction is used to predict a sample of a target block by a first predictor obtained from a first reference array and a second predictor obtained from a second reference array different from the first reference array.

Figures 4, 5:
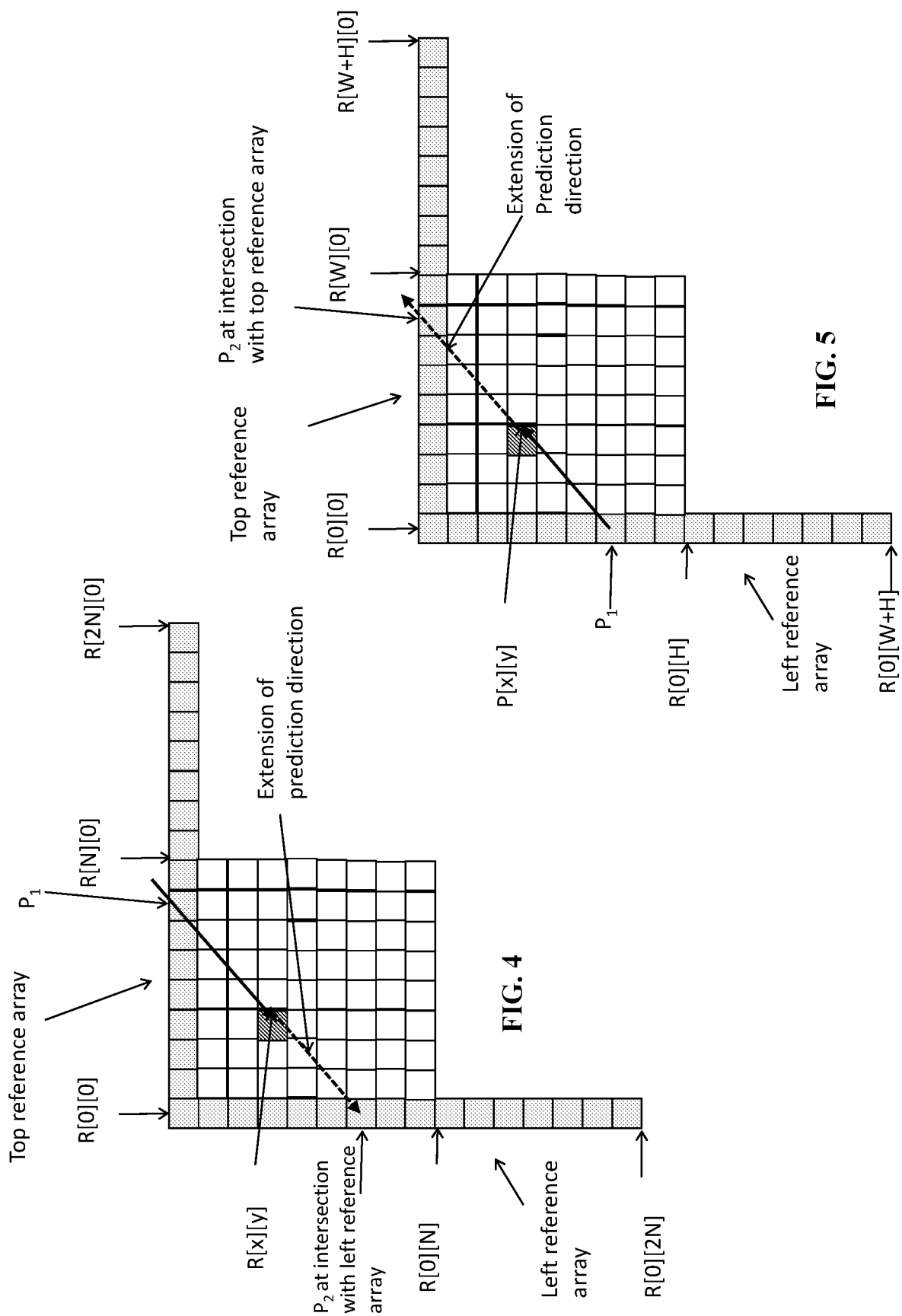
FIG. 4 is a pictorial example depicting the bi-directional intra prediction in a positive vertical direction from a top reference array and a left reference array.
FIG. 5 is another pictorial example depicting the bi-directional intra prediction in a positive horizontal direction from a top reference array and a left reference array.

As shown in, e.g., FIG. 4 and FIG. 5, the prediction direction is extended on the opposite side to obtain the second predictor for a target pixel P[x][y]. The second predictor is located on a second reference array (that is, an array which does not contain the first predictor). With two predictors, instead of simply copying the first predictor as done in HEVC, a value is interpolated at the target pixel location and used as the predicted value, the two predictors being substantially on a line based on a direction corresponding to the directional intra prediction mode.

As an example shown in FIG. 4, a predicted value for the target sample P[x][y] is obtained by interpolation between predictor $P_1$ from the top reference array and predictor $P_2$ from left reference array. Predictor $P_1$ or $P_2$ may be obtained by interpolation between the two closest reference samples as described above. For example, the predictor $P_2$ is in the left reference array substantially at the intersection with the directional prediction line given by an intra directional prediction.

As another example shown in FIG. 5, a predicted value for the target sample P[x][y] is obtained by interpolation between predictor $P_1$ from the left reference array and predictor $P_2$ from top reference array. In this example, the predictor $P_2$ is in the top reference array substantially at the intersection with the directional prediction line given by an intra directional prediction.

Given that the reference arrays have finite size of 2N+1 samples in HEVC (1+W+H in case of JEM), for some prediction directions, it is not possible to have a second predictor from the other reference array for some target pixels since the extension of the prediction direction will not intersect the other reference array. In those cases, in one method, the second predictor is estimated by repeating the last sample value of the other reference array beyond the array. For example, as shown in FIG. 5, for a target pixel, if the second predictor falls beyond the length of the left reference array, we just use the last left reference sample, that is, the sample R[0][W+H]. The left reference array is extended below as much as required.

In another method, a new reference array is estimated using reference samples on the existing two reference arrays. For example, a bottom reference array can be constructed from R[0][W+H] to R[W+H][W+H], wherein unknown samples from R[1][W+H] to R[W+H][W+H] are estimated using linear interpolation of reference samples R[0][W+H] (on the left reference array) and R[W+H][0] (on the top reference array). Alternatively, in another method, the bottom reference samples are simple repetitions of the reference sample R[0][W+H]. The second predictor is estimated at the intersection of the extension of the prediction direction with the new reference array.

While bi-directional intra prediction may produce BD (Bjøntegaard-Delta) rate improvement over the conventional uni-directional intra prediction, it is recognized that the additional complexity may be considered too high for the future video coding standards. Accordingly, the present embodiments make further improvements at reducing the complexity of the bi-directional intra prediction while maintaining a good BD-rate performance. These improvements are described in detail below.

In an exemplary embodiment, one improvement is to apply bi-directional prediction only to a subset of positive angular directions closest to the diagonal directions. The selected subset of the directions provides the maximum gain with bi-directional intra prediction due to the availability of true reference samples on both sides for majority of target pixels.

In another exemplary embodiment, another improvement is that the bi-directional intra prediction would only be applied to larger block sizes. It is observed that if a target block is of a small size, then the difference between the two predictors for a target pixel is usually small. Consequently, the gain due to the bi-directional intra prediction, which makes the prediction using a linear interpolation of the two predictors, will be marginal. Therefore, it makes sense to apply the bi-directional intra prediction only to larger block sizes.

In another exemplary embodiment, another improvement is that a predicted sample value is not further filtered by a smoothing filter when the above bi-directional intra prediction is used. In HEVC and JEM, a post-processing/post-filtering by a smoothing/deblocking filter (e.g., a low-pass filter) is applied to certain prediction directions to have smoother changes at the block boundaries. In the case of bi-directional intra prediction, this filtering adds further complexity without leading to higher prediction quality. Therefore, it is not necessary to have this post-filtering with the bi-directional prediction.

In another exemplary embodiment, another improvement is to apply bi-directional intra prediction only to the luma component and not the chroma component of a block being encoded or decoded, since the variation of chroma intensity is usually small.

As described above, the bi-directional intra prediction requires two predictors for a target pixel. Since the reference samples are available only on the top and the left sides of a target block, for certain pixels, the second predictor does not belong to either reference array. Therefore, for a good tradeoff between BD-rate performance and complexity, the bi-directional prediction may be applied only for those directions where a majority of the target pixels would have two predictors available.

Consider the angular prediction directions as shown in FIG. 2B, and the available reference arrays as shown in FIG. 4 and FIG. 5, all target pixels in a block will have two predictors available only for modes 2 and 34 in HEVC, or modes 2 and 66 in JEM. As the mode index gradually increases from 2, or decreases from 34 (or 66 in JEM), the number of target pixels having two predictors available will gradually decrease. As the mode index approaches the directly horizontal (mode 10 in HEVC, or 18 in JEM) or directly vertical (mode 26 in HEVC or mode 50 in JEM), the number of target pixels having two predictors available will approach zero. For negative prediction directions, all target pixels will have only one predictor available.

Figure 6:
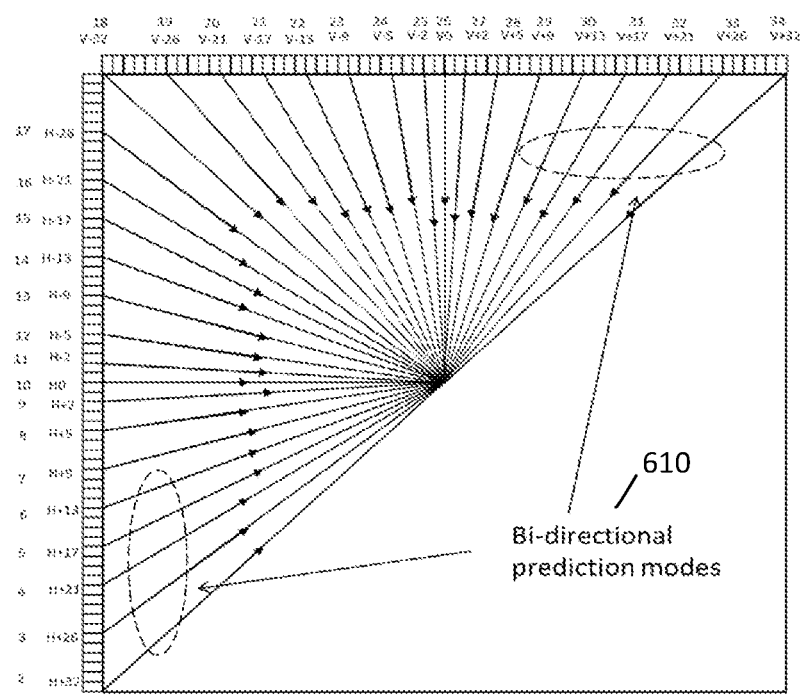
FIG. 6 illustrates a subset of a plurality of directional intra prediction modes being selected for the bi-directional intra prediction according to an embodiment.

Accordingly, in order to reduce the complexity associated with the bi-directional prediction, we may thus apply it only over a few prediction directions closest to mode 2 and 34 in HEVC, or mode 2 and 66 in JEM. The number of directions chosen may be preset with a threshold which will be known to both the encoder and the decoder. If K denotes a preset or selected number indicating the number of chosen modes, only the modes from 2 to 2+K and 34-K to 34 (or from 66-K to 66 in JEM) may apply the bi-directional intra prediction. In one example, K may range from 2 to 16. FIG. 6 illustrates an example for HEVC where K is preset to 5. Therefore, a subset 610 comprising HEVC intra modes 2-6 and modes 30-34 are eligible and maybe selected for the bi-directional intra prediction as shown in FIG. 6.

In one exemplary embodiment, these prediction directions may still choose uni-directional prediction instead, based on RD cost. Therefore, a 1-bit signaling flag may be used to indicate whether uni-directional or bi-direction prediction is used for the chosen subset of prediction modes. Optionally, in another embodiment, we may choose to have these directions to have only bi-directional prediction, which will then not require any additional signaling. In this option, the remaining angular modes will only be uni-directionally predicted.

In JEM, blocks may have both square and rectangular shapes due to the QTBT partitioning. For a rectangular block, when the above prediction modes are considered, the target pixels in a block will be nearer to one of the reference arrays than the other (i.e., either the vertical reference array on the left or the horizontal reference array on the top). In these cases, the gain due to the bi-directional prediction will not be considerable for those target pixels close to one of the reference arrays, since those target pixels would be sufficiently well predicted using just the close reference array. Therefore, to have a good tradeoff between BD-rate performance and the complexity, we may limit the bi-directional prediction based on the shape of the current block being encoded or decoded as to be described below.

Figure 7A:
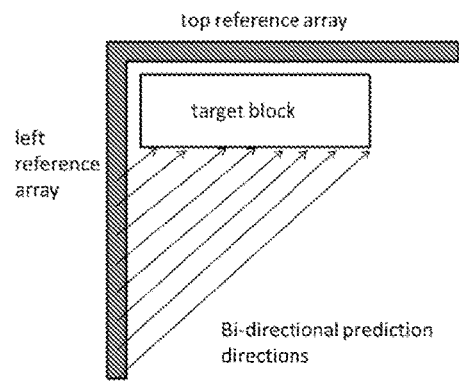
FIG. 7A illustrates a subset of directional intra prediction modes being selected for the bi-directional intra prediction when a block's width is greater than the block's height, according to another embodiment.
Figure 7B:
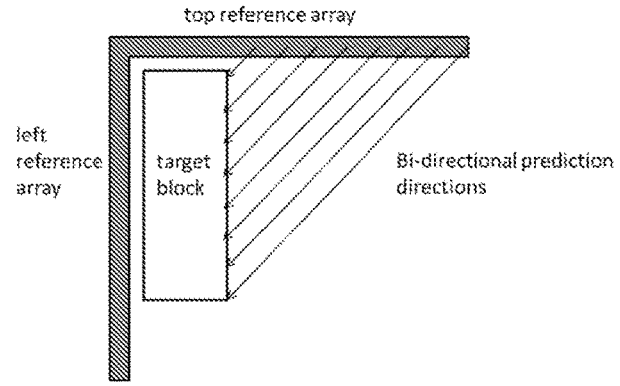
FIG. 7B illustrates a subset of directional intra prediction modes being selected for the bi-directional intra prediction when a block's height is greater than the block's width, according to another embodiment.

As shown in FIG. 7A, for a rectangular block with its width greater than height, only the horizontal positive directions from 2 to 2+K are subject to the bi-directional intra prediction in an exemplary embodiment, where K denotes a preset or selected number indicating the number of the chosen modes. On the other hand, for a rectangular block with its height greater than width, only the vertical positive directions from 66-K to 66 are applied with the bi-directional prediction. In both cases, the bi-directional prediction may be forced, or optional for the respective modes based on comparison of RD cost. The latter will require a 1-bit signaling flag for blocks having those prediction modes. For a better RD trade-off, this restriction may be applied only to a certain class of rectangular blocks such as block sizes of 32×4, 4×32, 32×8, 8×32, etc., instead of all rectangular blocks.

For even better improvements, since the rectangular blocks may have different shapes as noted above (e.g., 4×32, 4×16, 16×8, etc.), we may decide on the number of prediction modes eligible for bi-directional prediction further based on whether the rectangle's height is greater than its width, or vice versa. In addition, the number of prediction modes eligible for bi-directional prediction may be further based on the ratio of its width to height (for a block with its height greater than width), or the ratio of its height to width (for a block with its width greater than height).

Accordingly, let Kmax be the maximum number of positive directions closest to either the most positive horizontal directional mode (e.g., mode 2 for both HEVC or JEM), or the most positive vertical directional mode (e.g., mode 34 for HEVC or mode 66 for JEM), which are eligible for bi-directional prediction. For a block with its height greater than width, the number of positive horizontal directions (directions closest to mode 2) may be decided as K_2=Kmax*(W/H), where W and H are the width and height of the block. The number of positive vertical directions (directions closest to mode 34 for HEVC or mode 66 for JEM) is K_66=Kmax. On the other hand, for a block with its width greater than height, K_2=Kmax and K_66=Kmax*(H/W).

With the above formulation, the number of modes eligible for bi-directional intra prediction is dependent on the shape of a target block. As an example, consider three tall target blocks of size 4×8, 4×16, and 4×32 (in W×H format). Selecting Kmax as 16, we will get K_2=8 for 4×8 block, K_2=4 for 4×16 block, and K_2=2 for 4×32 block. All three blocks will have K_66=16.

As mentioned earlier, in bi-directional intra prediction, the prediction value may be obtained as a linear interpolation of two predictors. Linear interpolation is basically a weighted sum that will result in an intermediate value between the two predictor values. This weighted sum may be alternatively implemented as the addition of the first predictor to an update term $$\Delta P = \frac{L}{L+R}(P_2 - P_1),$$

where L and R denote the distances of the first and second predictors, respectively, from the target pixel, at (x, y). The ratio L/(L+R) has a fractional value between 0 and 1. Therefore, the absolute magnitude of the predictor difference, i.e. $|P_2-P_1|$, has to be sufficiently large compared to this ratio such that their multiplication may result in an integral value for $\Delta P$. This requires that the second predictor $P_2$ be much different from $P_1$. Accordingly, if the two predictors are only a few pixels apart, which is the case when the target block is small, then the gain due to the bi-directional prediction will not be considerable. Therefore, as an improvement to reduce the complexity, we propose to apply the bi-directional prediction only to large blocks. The largeness of a block may be defined in various ways, for example, a block may be considered large if the sum of height and width is greater than a preset value (e.g., 8, 16, 32, or 64 pixels). As another example, the block may be considered large if either the height or the width is greater than a threshold (e.g., 4, 8, 16, or 32 pixels).

As described before, for some modes of intra prediction, to smooth the prediction discontinuities at the target block boundary, a smoothing/deblocking filter is applied along the edge of the reference array that was not used for the prediction. In HEVC, after the intra prediction block has been generated for VER (directly vertical) and HOR (directly horizontal) intra modes, the left-most column and top-most row of the prediction samples are further adjusted, respectively. Similar post processing smoothing has been further extended in the JEM to several diagonal intra modes, and boundary samples up to four columns or rows are further adjusted using a two-tap filter (for intra modes 2 and 66), or a three-tap filter (for intra modes 3-10 and 58-65). Examples of the boundary prediction filters for intra mode 66, and mode 58-65 are shown respectively in FIG. 8A and FIG. 8B.

Figure 8A:
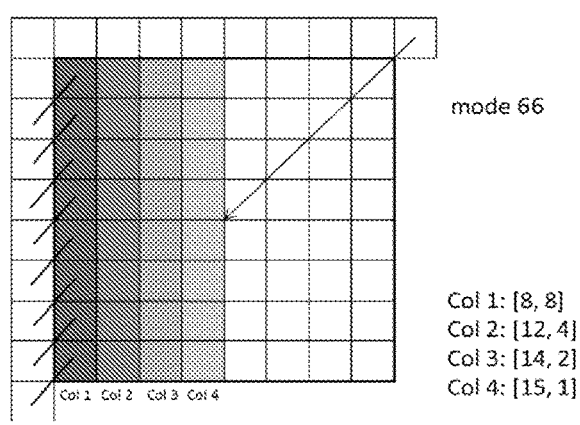
FIG. 8A and FIG. 8B respectively illustrate examples of the boundary prediction filters for intra mode 66, and modes 58-65 of JEM.

For example, as shown in FIG. 8A, for mode 66, the four pixels on row y are filtered as:

$$P[1][y]=(8*P[1][y]+8*leftRef[1+y]+8)>>4;$$

$$P[2][y]=(12*P[2][y]+4*leftRef[2+y]+8)>>4;$$

$$P[3][y]=(14*P[3][y]+2*leftRef[3+y]+8)>>4;$$

$$P[4][y]=(15*P[4][y]+leftRef[4+y]+8)>>4;$$

where leftRef[y] denotes the reference sample on the left side of the target block at y=1, 2, . . . .

Figure 8B:
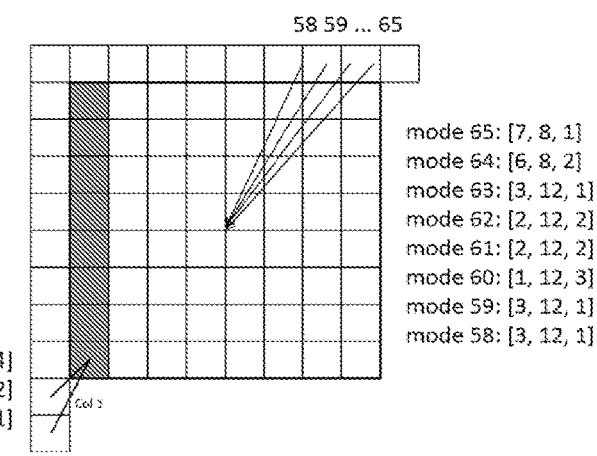

As shown in FIG. 8B, for modes 58-65, the single pixel on row y is filtered as: P[1][y]=(filter[1] *P[1][y]+filter[0]* leftRef[y+offset[0]]+filter[2]*leftRef[y+offset[1]]+8)>>4, where filter[k] denotes the kth filter coefficient associated with the mode, and offset[0] and offset[ ] denote the y-offsets of the two reference samples from the target pixel location. Offset[0]=1 and offset[1]=2 for modes 60-65, and offset[0]= 2 and offset[1]=3 for modes 58-59.

The boundary prediction filters for intra modes 2 and 3-10 are similar (not shown). Using the reference samples on the top, the target pixels in the rows 1-4 are filtered in mode 2, and the pixels in row 1 are filtered in modes 3-10. This post-filtering is applied to luma blocks only.

Bi-directional intra prediction, because of its interpolation formulation, makes a gradual change of prediction pixels as we move along a prediction direction. Therefore, there is no further need of applying the above post-processing filtering when the selected subset of the prediction modes is subject to the bi-directional prediction. This can remove the complexity due to the post-filtering, while keeping the prediction quality more or less the same. Thus, post-processing filtering may be limited only to the uni-directional prediction cases.

A color video signal is normally represented in the YCbCr format in 4:2:0 resolution in which the color components Cb and Cr have half the resolution of the luma component Y in both x- and y-directions. Furthermore, the color component gradients are normally much less compared to that of the luma component. Therefore, as another complexity reduction improvement, we propose to apply the bi-directional prediction only to the luma component. The color components will use the usual prediction modes, for example, as defined in JEM. For example, in LM-CHROMA mode of JEM, the color components are predicted from the reconstructed value of the luma components in the same block. Since the bi-directional prediction is expected to produce better prediction for blocks having directional structures, it may indirectly improve the prediction for chroma components as well, when the LM-CHROMA mode is used while the corresponding luma component is bi-directionally predicted.

The above described improvements to the bi-directional intra prediction according to the present embodiments may be independently implemented, or one or more of them may also be selectively implemented together in a complementary way in order to provide the best tradeoff between BD-rate and complexity.

Figure 9:
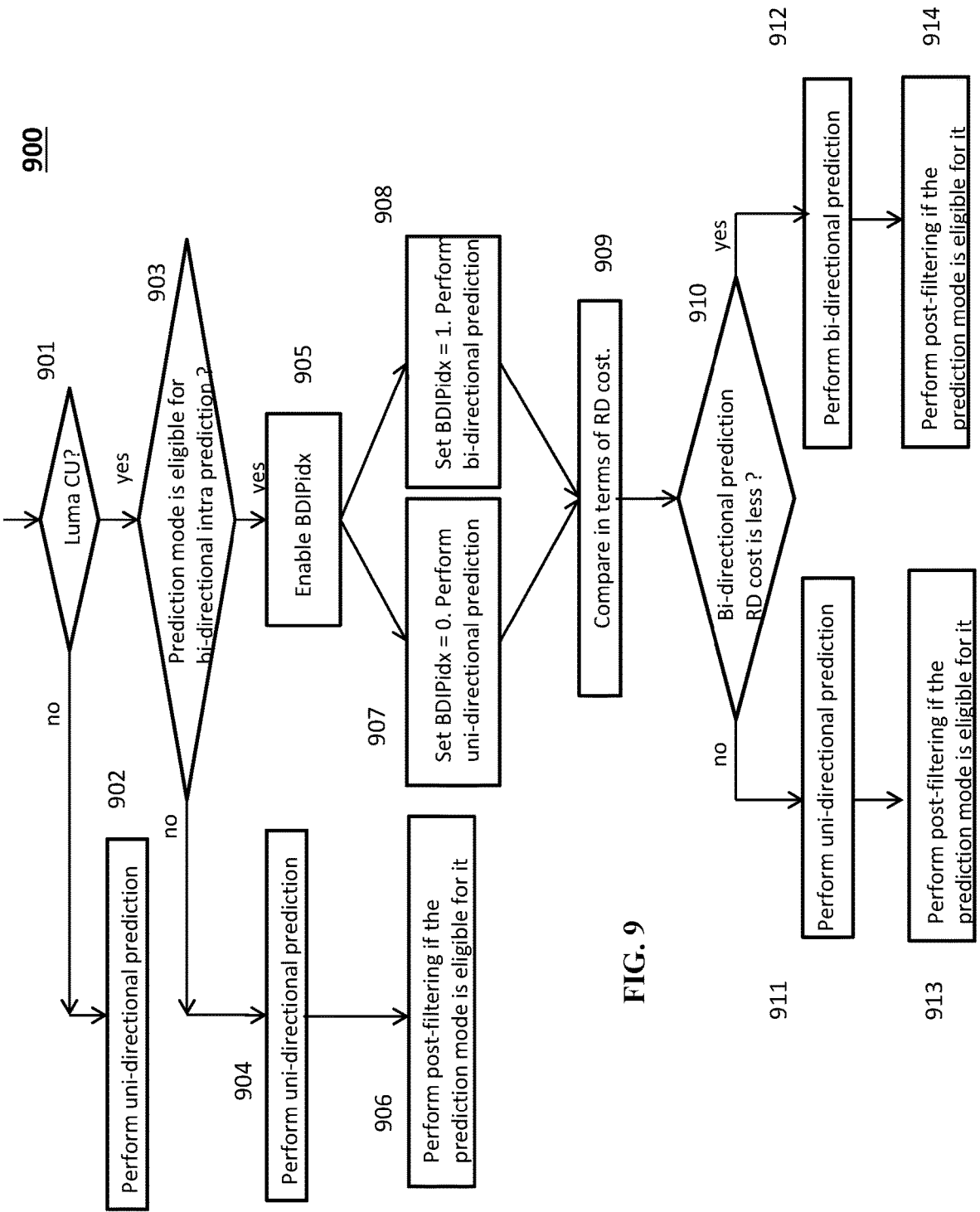
FIG. 9 illustrates an exemplary method of video encoding with bi-directional intra prediction, according to an embodiment.

FIG. 9 illustrates an exemplary encoding process 900 for limiting the bi-directional intra prediction to a fixed number of positive directions, according to an embodiment. In this embodiment, for any luma CU, we limit the bi-directional intra prediction to a fixed or preset number of positive directions along the vertical diagonal direction. The number of directions maybe, e.g., 2, 4, 8, 16, or 32 as described previously, or any other fixed custom value. For a target block, these selected modes are tested in terms of RD cost with both uni-directional and bi-directional predictions in order to determine whether uni-directional or bi-directional mode should be selected. For signaling the prediction, we use a 1-bit flag which is entropy encoded using context 0, or a mode-dependent or neighborhood-dependent context. The remaining angular modes undergo only uni-directional prediction. For the chroma CUs, the normal uni-directional prediction method is used.

Accordingly, as shown in FIG. 9, the input for the exemplary encoding process 900 is, e.g., information about prediction mode, block type (i.e., luma or chroma), and reference array(s) used for the intra prediction. At step 901, a determination is made to see if the current block being encoded is a luma block. If the decision is no, then the block is a chroma block and the chroma block is uni-directionally predicted as normal, at step 902. On the other hand, if the current block is a luma block then process 900 continues at step 903. At step 903, a determination is made to see if the current prediction mode is eligible for the bi-directional intra prediction, according to the present embodiments. That is, for example, whether the current prediction mode belongs to e.g., the subset 610 of intra-prediction directions as shown in FIG. 6 and as described previously. Additionally, the determination may also include the block size check, for example, if the target block is sufficiently large based on the lengths of its height and width. On the other hand, if the current mode is not part of the selected subset which is eligible for the bi-directional prediction, then the current mode is uni-directionally predicted and processed as usual, at steps 904 and 906.

Continued on at step 905 of FIG. 9, a 1-bit flag, BDIPidx, is enabled and will be set later to either 0 to indicate uni-directional prediction or 1 to indicate bi-directional prediction, based on the RD cost comparison between the uni-directional prediction and the bi-directional prediction at steps 907-909. At step 910, if it is determined that the RD cost is less for bi-directional prediction, then the bi-directional intra prediction is used for the selected intra mode direction, at step 912. At step 914, post-processing smooth filtering may be applied to the current samples as already described previously. Step 914 can also be omitted as described before. On the other hand, if it is determined that the RD cost is larger for bi-directional prediction, then the uni-directional intra prediction is used for the selected intra mode, at step 911. At step 913, post-processing smooth filtering may also be applied to the uni-directional intra predicted samples as already described previously.

Figure 10:
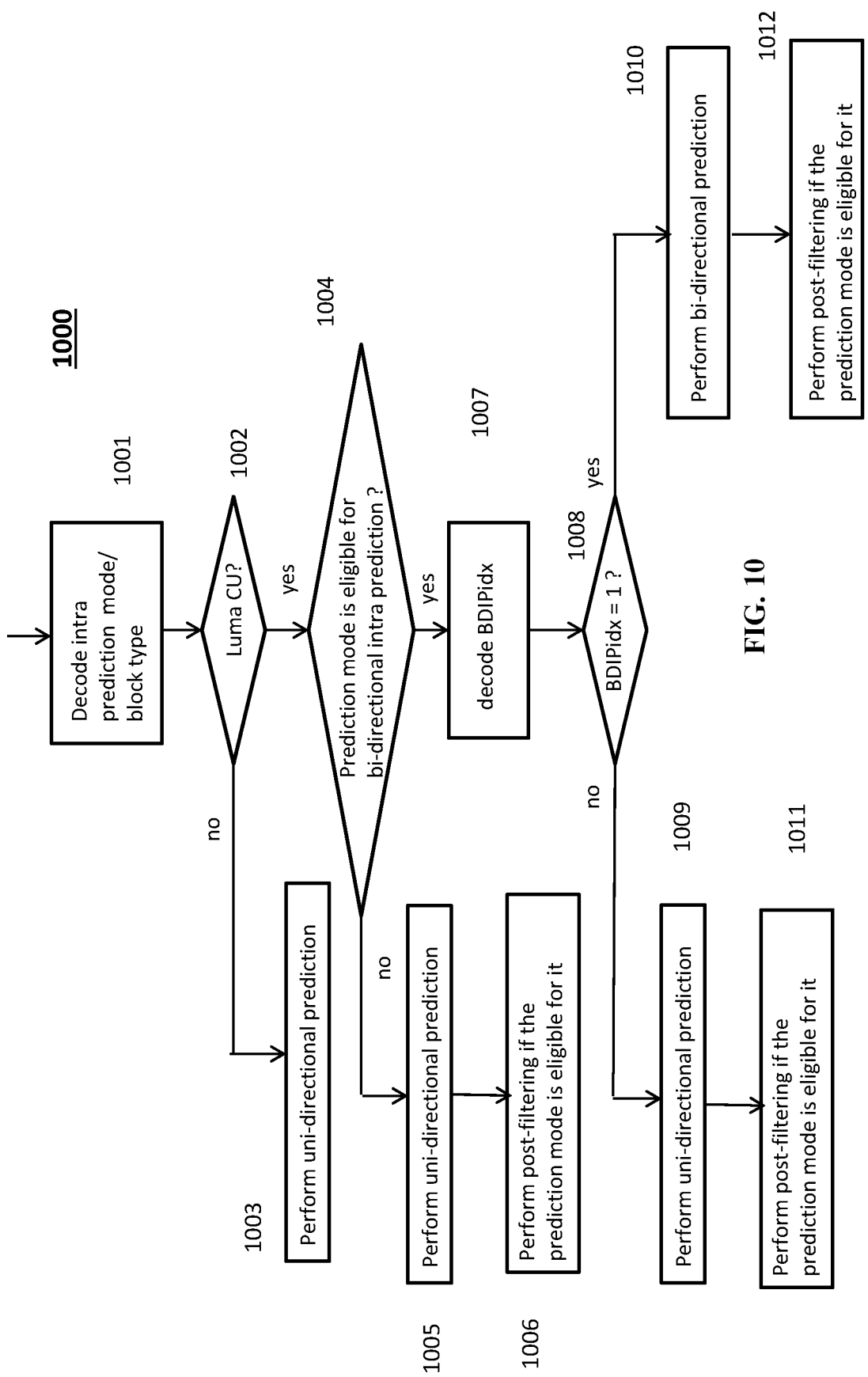
FIG. 10 illustrates an exemplary method of video decoding with bi-directional intra prediction, according to an embodiment.

FIG. 10 illustrates an exemplary decoding process 1000 to be performed at a decoder for limiting the bi-directional intra prediction to a fixed number of positive directions, according to an embodiment. The exemplary process 1000 is the complementary decoding process of the encoding process 900 shown in FIG. 9. The input for the exemplary decoding process 1000 is, e.g., encoded information about prediction and reference array(s) obtained from the received bitstream. The output is the prediction for the current CU.

Accordingly, at step 1001 of FIG. 10, the prediction mode information and block type information are decoded. At 1002, a determination is made to see if the current block being decoded is a luma block. If the decision is no, then the block is a chroma block and the chroma block is uni-directionally predicted, at step 1003. On the other hand, if the current block is a luma block then process 1000 continues at step 1004. At step 1004, a determination is made to see if the current prediction mode is eligible for the bi-directional intra prediction, according to the present embodiments. That is, for example, whether the current prediction mode belongs to e.g., the subset 610 of intra prediction directions as shown in FIG. 6 and as described previously. Additionally, the determination may also include the block size check, for example, if the target block is sufficiently large based on the lengths of its height and width. If on the other hand, the current mode is not part of the subset which is eligible for the bi-directional prediction, then the current mode is uni-directionally predicted and processed as usual, at steps 1005 and 1006.

Continued on at step 1007 of FIG. 10, the indication flag, BDIPidx, is decoded. As determined at step 1008, if BDIPidx is 1 indicating that the current intra coding mode is bi-directionally predicted at the encoder, then at step 1010, the bi-directional prediction is invoked for the current mode at the decoder. At step 1012, post processing smooth filtering to may be applied to the current samples as already described previously. Step 1012 can also be omitted as described before. If, on the other hand, step 1008 determines that BDIPidx is 0 indicating that the current intra coding mode is not bi-directionally predicted at the encoder, then the uni-directional intra prediction is used for the selected intra mode, at step 1009. At step 1011, post-processing smooth filtering may also be applied to the uni-directional intra predicted samples as already described previously FIG. 11 illustrates another exemplary encoding process 1100 for limiting the bi-directional intra prediction to a preset number of positive directions, according to an embodiment. This encoding process 1100 is similar to the ending process 900 shown in FIG. 9. The difference is that for the current encoding process 1100, the selected set of intra-prediction modes are not RD tested to decide if these may still be un-directionally coded. That is once selected, the selected subset of the intra predicted modes are then bi-directionally coded according to the present embodiments, without a RD test to decide. Conversely, the remaining un-selected or un-eligible angular modes will undergo only uni-directional prediction. In this embodiment, for the chroma CUs, the normal uni-directional prediction method is used.

Accordingly, as shown in FIG. 1100, the input for the exemplary encoding process 1100 is, e.g., information about prediction mode, block type (i.e., luma or chroma), and reference array(s) used for the intra prediction. The output is the prediction for the current CU. At step 1101, a determination is made to see if the current block being encoded is a luma block. If the decision is no, then the block is a chroma block and the chroma block is uni-directionally predicted, at step 1102. On the other hand, if the current block is a luma block then process 1100 continues at step 1103. At step 1103, a determination is made to see if the current prediction mode is eligible for the bi-directional intra prediction, according to the present embodiments. That is, for example, whether the current prediction mode belongs to e.g., the subset 610 of intra-prediction directions as shown in FIG. 6 and as described previously. Additionally, the determination may also include the block size check, for example, if the target block is sufficiently large based on the lengths of its height and width. On the other hand, if the current mode is not part of the selected subset which is eligible for the bi-directional prediction, then the current mode is uni-directionally predicted and processed as usual, at steps 1104 and 1106.

Figure 11:
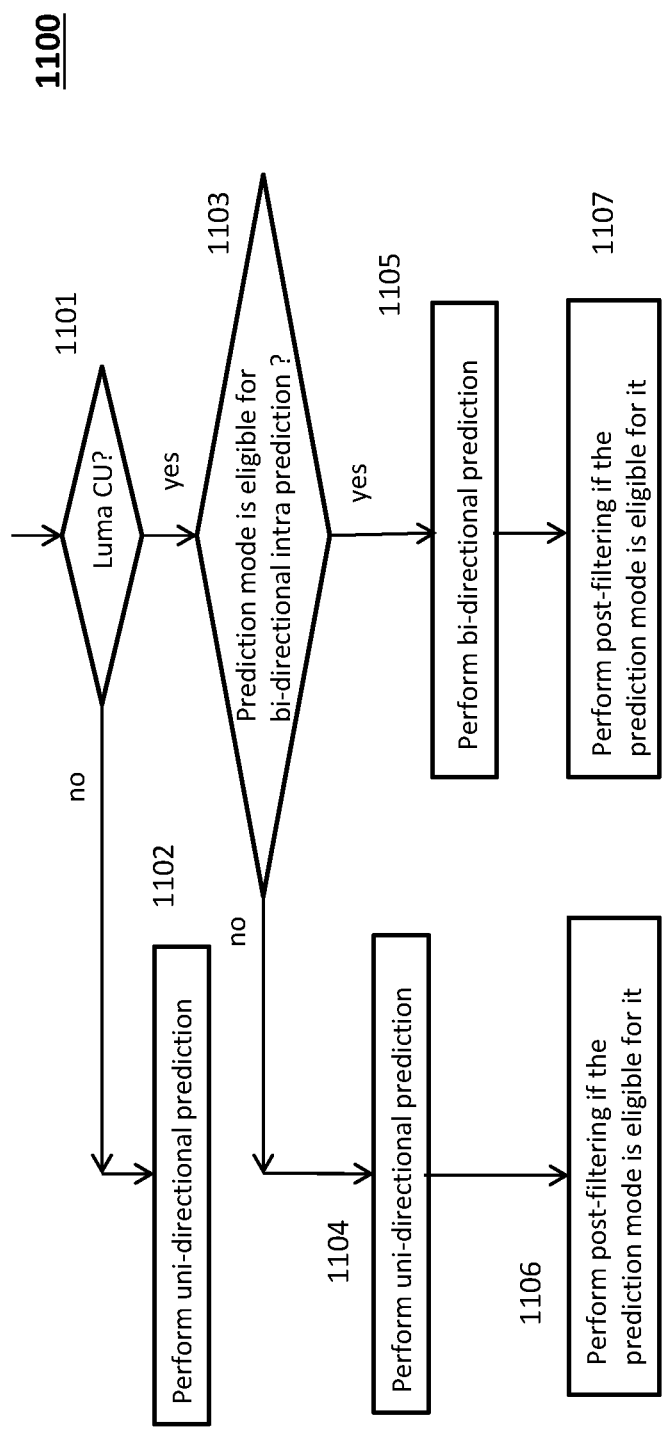
FIG. 11 illustrates another exemplary method of video encoding with bi-directional intra prediction, according to an embodiment.

Continued on at step 1105 of FIG. 11, the bi-directional intra prediction is used for the selected intra mode direction if the current mode is determined to be eligible for bi-direction prediction at step 1103. At step 1107, post processing smooth filtering may be applied to the current samples as already described previously. Step 1107 can also be omitted as described before.

Figure 12:
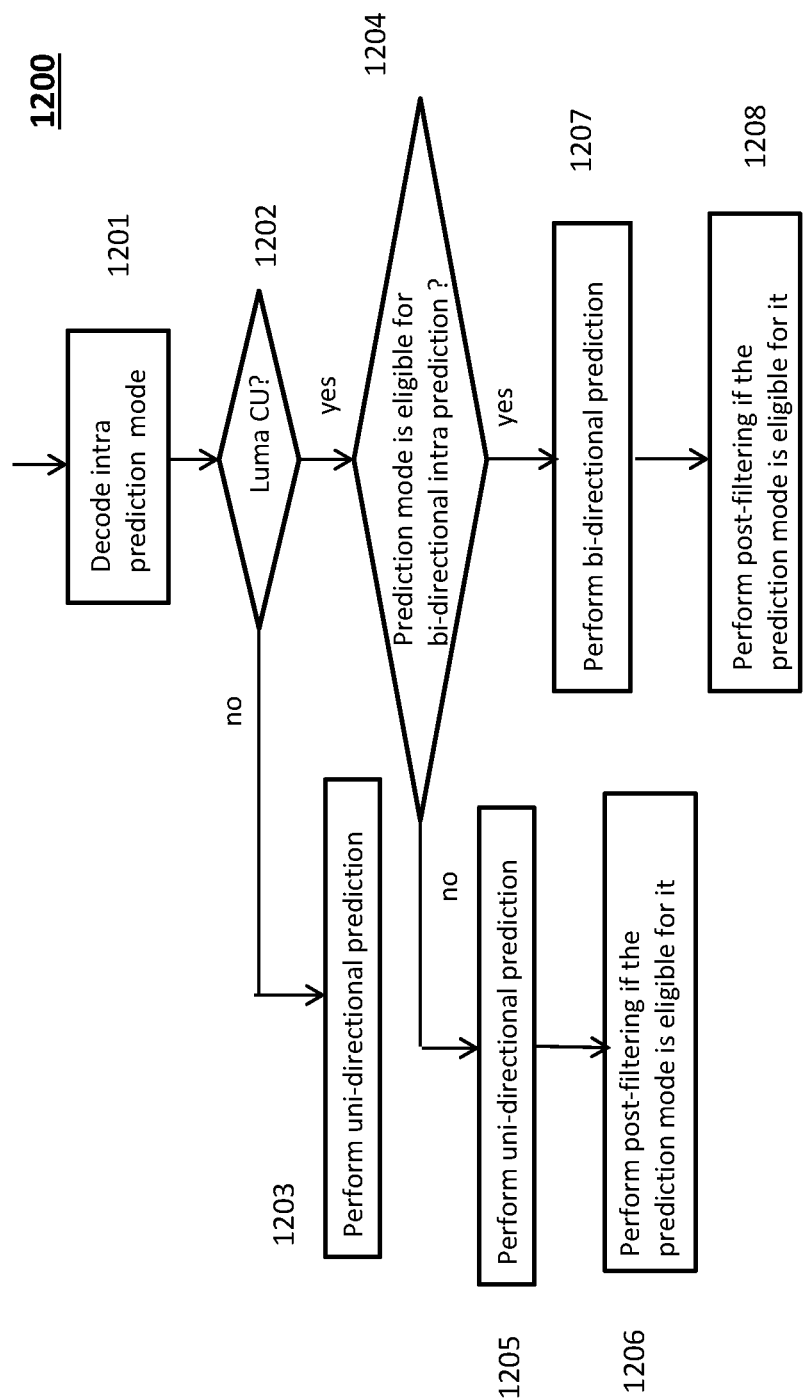
FIG. 12 illustrates another exemplary method of video decoding with bi-directional intra prediction, according to an embodiment.

FIG. 12 illustrates an exemplary decoding process 1200 to be performed at a decoder for limiting the bi-directional intra prediction to a preset number of positive directions, according to an embodiment. The exemplary process 1200 is the complementary decoding process of the encoding process 1100 shown in FIG. 11. As shown in FIG. 12, the input for the exemplary decoding process 1200 is, e.g., encoded information about prediction and reference array(s) obtained from the received bitstream. The output is the prediction for the current CU.

Accordingly, at step 1201 of FIG. 12, the received encoded prediction mode information and block type information are decoded. At 1202, a determination is made to see if the current block being decoded is a luma block. If the decision is no, then the block is a chroma block and the chroma block is uni-directionally predicted, at step 1203. On the other hand, if the current block is a luma block then process 1000 continues at step 1204. At step 1204, a determination is made to see if the current prediction mode is eligible for the bi-directional intra prediction, according to the present embodiments. That is, for example, whether the current prediction mode belongs to e.g., the subset 610 of intra-prediction directions as shown in FIG. 6 and as described previously. Additionally, the determination may also include the block size check, for example, if the target block is sufficiently large based on the lengths of its height and width. On the other hand, if the current mode is not part of the selected subset which is eligible for the bi-directional prediction, then the current mode is uni-directionally predicted and processed as usual, at steps 1205 and 1206.

Continued on at step 1207 of FIG. 12, the bi-directional intra prediction is used for the selected intra mode direction if the current mode is determined to be eligible for the bi-direction prediction at step 1204. At step 1208, post-processing smooth filtering may be applied to the current samples as already described previously. Step 1208 can also be omitted as described before.

Table 2 below shows the improvements to JEM by using the present embodiments. In the experiment, we apply bi-directional prediction to 32 modes that are closest to the diagonal direction, i.e., modes 2 to 17 and modes 51 to 66 in JEM. These 32 modes are tested with both uni-directional and bi-directional predictions whereas the remaining angular modes are tested with only uni-directional prediction. We remove post-filtering with bi-directional prediction while using the exact interpolation formulation in bi-directional prediction. Furthermore, only blocks of size larger than 4×4 blocks are subjected to bi-directional predictions. Blocks of size 4×4 use the existing uni-directional intra prediction. We run the codec in All-INTRA (AI) configuration over one frame from all test sequences. Table 2 below shows the average BD-rate performance for different classes of test sequences and the overall BD-rate performance.

TABLE 2

BD rate performance of the proposed bi-directional prediction

| | Over JEM | | | | |
|---|---|---|---|---|---|
| | Y | U | V | EncT | DecT |
| Class A1 | −0.39% | 0.29% | −0.70% | 101% | 98% |
| Class A2 | −0.44% | −0.40% | −0.35% | 103% | 98% |
| Class B | −0.10% | 0.20% | 0.30% | 101% | 96% |
| Class C | −0.06% | −0.21% | −0.10% | 101% | 92% |
| Class D | −0.15% | 0.22% | −1.56% | 101% | 90% |
| Class E | −0.04% | −0.79% | −1.24% | 101% | 97% |
| Overall | −0.20% | −0.07% | −0.54% | 101% | 95% |

In the above, we describe various embodiments for reducing computational complexity for bi-directional intra prediction. These embodiments can be implemented in bi-directional intra prediction for positive intra prediction directions and for negative intra prediction directions.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the precision of prediction direction (1/32), or the length of reference array (W, H, W+H, or 1+W+H). It should be noted that the specific values are for exemplary purposes and the present embodiments are not limited to these specific values.

In the above, various embodiments are described with respect to HEVC, or JEM. For example, various methods of bi-directional intra prediction as described above can be used to modify the intra prediction module (160, 360) of the JEM or HEVC encoder and decoder as shown in FIG. 1 and FIG. 3. However, the present embodiments are not limited to JEM or HEVC, and can be applied to other standards, recommendations, and extensions thereof.

Figure 13:
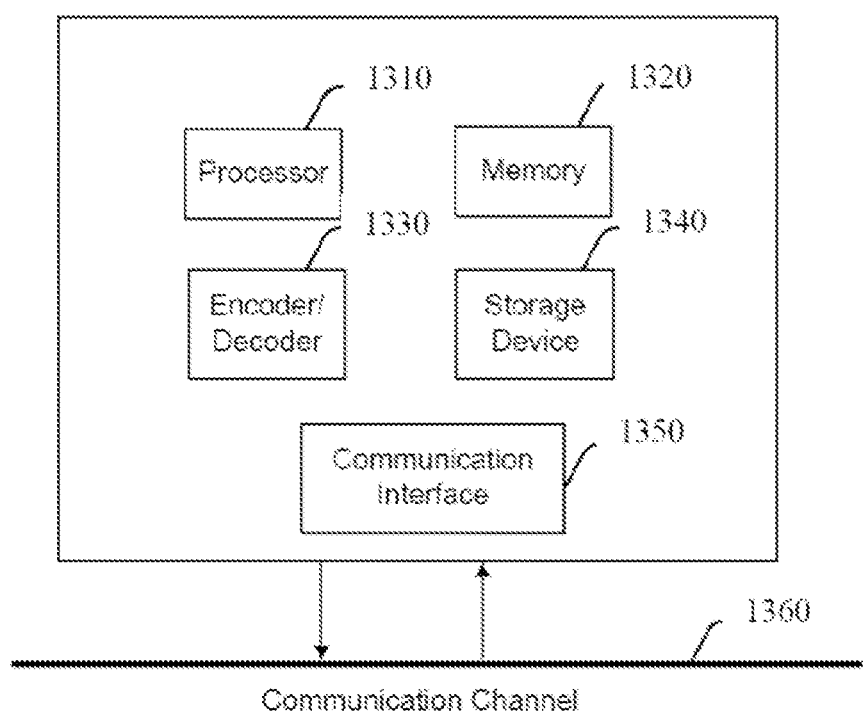
FIG. 13 illustrates a block diagram of an exemplary apparatus in which various aspects of the exemplary embodiments may be implemented.

FIG. 13 illustrates a block diagram of an exemplary system 1300 in which various aspects of the exemplary embodiments may be implemented. The system 1300 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 1300 may be communicatively coupled to other similar systems, and to a display via a communication channel as shown in FIG. 13 and as known by those skilled in the art to implement all or part of the exemplary video systems described above.

Various embodiments of the system 1300 include at least one processor 1310 configured to execute instructions loaded therein for implementing the various processes as discussed above. The processor 1310 may include embedded memory, input output interface, and various other circuitries as known in the art. The system 1300 may also include at least one memory 1320 (e.g., a volatile memory device, a non-volatile memory device). The system 1300 may additionally include a storage device 1340, which may include non-volatile memory, including, but not limited to, EEPROM, ROM, PROM, RAM, DRAM, SRAM, flash, magnetic disk drive, and/or optical disk drive. The storage device 1340 may comprise an internal storage device, an attached storage device, and/or a network accessible storage device, as non-limiting examples. The system 1300 may also include an encoder/decoder module 1330 configured to process data to provide encoded video and/or decoded video, and the encoder/decoder module 1330 may include its own processor and memory.

The encoder/decoder module 1330 represents the module(s) that may be included in a device to perform the encoding and/or decoding functions. As is known, such a device may include one or both of the encoding and decoding modules. Additionally, the encoder/decoder module 1330 may be implemented as a separate element of the system 1300 or may be incorporated within one or more processors 1310 as a combination of hardware and software as known to those skilled in the art.

Program code to be loaded onto one or more processors 1310 to perform the various processes described hereinabove may be stored in the storage device 1340 and subsequently loaded onto the memory 1320 for execution by the processors 1310. In accordance with the exemplary embodiments, one or more of the processor(s) 1310, the memory 1320, the storage device 1340, and the encoder/decoder module 1330 may store one or more of the various items during the performance of the processes discussed herein above, including, but not limited to the input video, the decoded video, the bitstream, equations, formulas, matrices, variables, operations, and operational logic.

The system 1300 may also include a communication interface 1350 that enables communication with other devices via a communication channel 1360. The communication interface 1350 may include, but is not limited to a transceiver configured to transmit and receive data from the communication channel 1360. The communication interface 1350 may include, but is not limited to, a modem or network card and the communication channel 1350 may be implemented within a wired and/or wireless medium. The various components of the system 1300 may be connected or communicatively coupled together (not shown in FIG. 13) using various suitable connections, including, but not limited to internal buses, wires, and printed circuit boards.

The exemplary embodiments may be carried out by computer software implemented by the processor 1310 or by hardware, or by a combination of hardware and software. As a non-limiting example, the exemplary embodiments may be implemented by one or more integrated circuits. The memory 1320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1310 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
    determining a subset of a plurality of directional intra prediction modes based on a shape of a block of a picture being decoded, wherein bi-directional intra prediction is limited to the subset of the plurality of directional intra prediction modes, wherein a number of intra prediction modes in said subset is based on (1) W/H, responsive to H>W for the block, or (2) H/W, responsive to W>H, W and H being width and height of the block, and wherein the subset of the plurality of directional intra prediction modes are limited to only (1) vertical positive directions, responsive to H>W for the block, or (2) horizontal positive directions, responsive to W>H for the block;
    selecting a directional intra prediction mode from the subset of the plurality of directional intra prediction modes;
    accessing, based on the directional intra prediction mode, a first predictor for a sample, the sample being within the block;
    accessing, based on the directional intra prediction mode, a second predictor for the sample, the first and second predictors being substantially on a line based on a direction corresponding to the directional intra prediction mode;
    bi-directionally intra predicting a sample value of the sample, by using the first and second predictors; and
    decoding the sample of the block based on the predicted sample value.

2. The method of claim 1, wherein when the block's width is greater than the block's height then the selected subset of the plurality of directional intra prediction modes comprises: Kmax number of positive horizontal directional intra prediction modes closest to the most positive horizontal directional mode.

3. The method of claim 1, wherein when the block's height is greater than the block's width then the selected subset of the plurality of directional intra prediction modes comprises Kmax number of positive vertical directional intra prediction modes closest to the most positive vertical directional mode.

4. The method of claim 1, wherein a block size for the block is determined before the selecting a subset of the plurality of directional intra prediction modes, and the selecting a subset of the plurality of directional intra prediction modes is made when the determined block size is greater than a preset value.

5. A method for video encoding, comprising:
    selecting a subset of a plurality of directional intra prediction modes based on a shape of a block of a picture being encoded, wherein bi-directional intra prediction is limited to the subset of the plurality of directional intra prediction modes, wherein a number of intra prediction modes in said subset is based on (1) W/H, responsive to H>W for the block, or (2) H/W, responsive to W>H, W and H being a width and height of the block, and wherein the subset of the plurality of directional intra prediction modes are limited to only (1) vertical positive directions, responsive to H>W for the block, or (2) horizontal positive directions, responsive to W>H for the block;
    selecting a directional intra prediction mode from the subset of the plurality of directional intra prediction modes;
    accessing, based on the directional intra prediction mode, a first predictor for a sample, the sample being within the block;
    accessing, based on the directional intra prediction mode, a second predictor for the sample, the first and second predictors being substantially on a line based on a direction corresponding to the directional intra prediction mode;

bi-directionally intra predicting a sample value of the sample, by using the first and second predictors; and encoding the sample of the block based on the predicted sample value.

6. The method of claim 5, wherein when the block's width is greater than the block's height then the selected subset of the plurality of directional intra prediction modes comprises: Kmax number of positive horizontal directional intra prediction modes closest to the most positive horizontal directional mode.

7. The method of claim 5, wherein when the block's height is greater than the block's width then the selected subset of the plurality of directional intra prediction modes comprises Kmax number of positive vertical directional intra prediction modes closest to the most positive vertical directional mode.

8. The method of claim 5, wherein a block size for the block is determined before the selecting a subset of the plurality of directional intra prediction modes, and the selecting a subset of the plurality of directional intra prediction modes is made when the determined block size is greater than a preset value.

9. An apparatus for video decoding, comprising:
one or more processors, wherein said one or more processors are configured to:
determine a subset of a plurality of directional intra prediction modes based on a shape of a block of a picture being decoded, wherein bi-directional intra prediction is allowable for the subset of the plurality of directional intra prediction modes, wherein a number of intra prediction modes in said subset is based on (1) W/H, responsive to H>W for the block, or (2) H/W, responsive to W>H, W and H being a width and height of the block, and wherein the subset of the plurality of directional intra prediction modes are limited to only (1) vertical positive directions, responsive to H>W for the block, or (2) horizontal positive directions, responsive to W>H for the block;
select a directional intra prediction mode from the subset of the plurality of directional intra prediction modes;
access, based on the directional intra prediction mode, a first predictor for a sample, the sample being within the block;
access, based on the directional intra prediction mode, a second predictor for the sample, the first and second predictors being substantially on a line based on a direction corresponding to the directional intra prediction mode;
bi-directionally intra predict a sample value of the sample, by using the first and second predictors; and
decode the sample of the block based on the predicted sample value.

10. The apparatus of claim 9, wherein when the block's width is greater than the block's height then the selected subset of the plurality of directional intra prediction modes comprises: Kmax number of positive horizontal directional intra prediction modes closest to the most positive horizontal directional mode.

11. The apparatus of claim 9, wherein when the block's height is greater than the block's width then the selected subset of the plurality of directional intra prediction modes comprises Kmax number of positive vertical directional intra prediction modes closest to the most positive vertical directional mode.

12. The apparatus of claim 9, wherein a block size for the block is determined before the selecting a subset of the plurality of directional intra prediction modes, and the selecting a subset of the plurality of directional intra prediction modes is made when the determined block size is greater than a preset value.

13. An apparatus for video encoding, comprising:
one or more processors, wherein said one or more processors are configured to:
select a subset of a plurality of directional intra prediction modes based on a shape of a block of a picture being encoded, wherein bi-directional intra prediction is allowable for the subset of the plurality of directional intra prediction modes, wherein a number of intra prediction modes in said subset is based on (1) W/H, responsive to H>W for the block, or (2) H/W, responsive to W>H, W and H being a width and height of the block, and wherein the subset of the plurality of directional intra prediction modes are limited to only (1) vertical positive directions, responsive to H>W for the block, or (2) horizontal positive directions, responsive to W>H for the block;
select a directional intra prediction mode from the subset of the plurality of directional intra prediction modes;
access, based on the directional intra prediction mode, a first predictor for a sample, the sample being within the block;
access, based on the directional intra prediction mode, a second predictor for the sample, the first and second predictors being substantially on a line based on a direction corresponding to the directional intra prediction mode;
bi-directionally intra predict a sample value of the sample, by using the first and second predictors; and
encode the sample of the block based on the predicted sample value.

14. The apparatus of claim 13, wherein when the block's width is greater than the block's height then the selected subset of the plurality of directional intra prediction modes comprises: Kmax number of positive horizontal directional intra prediction modes closest to the most positive horizontal directional mode.

15. The apparatus of claim 13, wherein when the block's height is greater than the block's width then the selected subset of the plurality of directional intra prediction modes comprises Kmax number of positive vertical directional intra prediction modes closest to the most positive vertical directional mode.

16. The apparatus of claim 13, wherein a block size for the block is determined before the selecting a subset of the plurality of directional intra prediction modes, and the selecting a subset of the plurality of directional intra prediction modes is made when the determined block size is greater than a preset value.

17. A non-transitory computer readable storage medium having stored thereon instructions for video decoding according to the method of claim 1.

18. A non-transitory computer readable storage medium having stored thereon instructions for video encoding according to the method of claim 5.

* * * * *